(12) United States Patent
Pan et al.

(10) Patent No.: US 9,573,330 B2
(45) Date of Patent: Feb. 21, 2017

(54) METHODS AND APPARATUS FOR JOINING TREADS

(71) Applicants: MICHELIN RECHERCHE ET TECHNIQUE S.A., Granges-Paccot (CH); COMPAGNIE GENERALE DES ETABLISSEMENTS MICHELIN, Clermont-Ferrand (FR)

(72) Inventors: Chinglin Pan, Mauldin, SC (US); David Chan Wah Lung, Simpsonville, SC (US); Michael D. Petrovich, Simpsonville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 15/065,223

(22) Filed: Mar. 9, 2016

(65) Prior Publication Data

US 2016/0185060 A1    Jun. 30, 2016

Related U.S. Application Data

(63) Continuation of application No. 14/114,695, filed as application No. PCT/US2011/042537 on Jun. 30, 2011, now Pat. No. 9,302,439.

(Continued)

(51) Int. Cl.
*B29C 65/00* (2006.01)
*B29D 30/54* (2006.01)
(Continued)

(52) U.S. Cl.
CPC ........... *B29D 30/54* (2013.01); *B29C 65/5057* (2013.01); *B29C 65/5071* (2013.01);
(Continued)

(58) Field of Classification Search
CPC .......... B29C 65/00; B29C 65/48; B29C 65/74; B29C 65/78; B29C 65/7864; Y10T 156/1317; Y10T 156/1702; Y10T 156/1737
(Continued)

(56) References Cited

U.S. PATENT DOCUMENTS 3,400,030 A * 9/1968 Burger .................... B29C 65/02
156/153
4,082,592 A * 4/1978 Raabe ................. B29C 65/5057
156/153

(Continued)

*Primary Examiner* — Mark A Osele
*Assistant Examiner* — Nickolas Harm
(74) *Attorney, Agent, or Firm* — Hahn Loeser & Parks LLP; Bret A. Hrivnak, Esq.

(57) ABSTRACT

The subject invention includes methods and apparatus for joining treads. Such methods include the step of providing a first tread portion and a second tread portion for forming a joined tread, each tread portion comprising a section of tire tread extending lengthwise from a terminal end. Additional steps include providing a first fixture configured to retain the first tread portion and a second fixture configured to retain the second tread portion and securing the first tread portion into the first fixture and securing the second tread portion into the second fixture, each of the first and second fixtures being arranged within the first and second fixtures such that the terminal end of each tread portion is in communication with a joining side of each fixture. The methods further include directing the terminal ends towards each other and into forceful engagement with an elastomeric joining material arranged between the terminal ends.

20 Claims, 7 Drawing Sheets

Related U.S. Application Data

(60) Provisional application No. 61/481,194, filed on Apr. 30, 2011.

(51) Int. Cl.
  *B29C 65/50* (2006.01)
  *B29D 30/06* (2006.01)
  *B29C 65/48* (2006.01)
  *B29C 65/74* (2006.01)
  *B29C 65/78* (2006.01)
  *B29L 30/00* (2006.01)
  *B29D 30/52* (2006.01)
  *B29K 9/00* (2006.01)
  *B29K 21/00* (2006.01)

(52) U.S. Cl.
  CPC ...... *B29C 65/7841* (2013.01); *B29C 66/1142* (2013.01); *B29C 66/326* (2013.01); *B29C 66/4322* (2013.01); *B29C 66/4324* (2013.01); *B29C 66/5241* (2013.01); *B29D 30/0681* (2013.01); *B29D 30/52* (2013.01); *B29C 65/00* (2013.01); *B29C 65/48* (2013.01); *B29C 65/4835* (2013.01); *B29C 65/74* (2013.01); *B29C 65/78* (2013.01); *B29C 65/7864* (2013.01); *B29C 66/71* (2013.01); *B29D 2030/523* (2013.01); *B29K 2009/00* (2013.01); *B29K 2021/00* (2013.01); *B29L 2030/002* (2013.01); *Y10T 156/1052* (2015.01); *Y10T 156/1317* (2015.01); *Y10T 156/1702* (2015.01); *Y10T 156/1737* (2015.01); *Y10T 156/1739* (2015.01)

(58) Field of Classification Search
  USPC .......................... 156/157, 304.1, 304.5, 502
  See application file for complete search history.

(56) References Cited

U.S. PATENT DOCUMENTS

| | | | | |
|---|---|---|---|---|
| 4,211,594 A | * | 7/1980 | Freitag | B29C 65/18 |
| | | | | 156/157 |
| 5,690,776 A | * | 11/1997 | Anderson | B29C 65/20 |
| | | | | 156/304.2 |
| 2004/0118513 A1 | * | 6/2004 | Dyrlund | B29C 66/1142 |
| | | | | 156/304.1 |

* cited by examiner

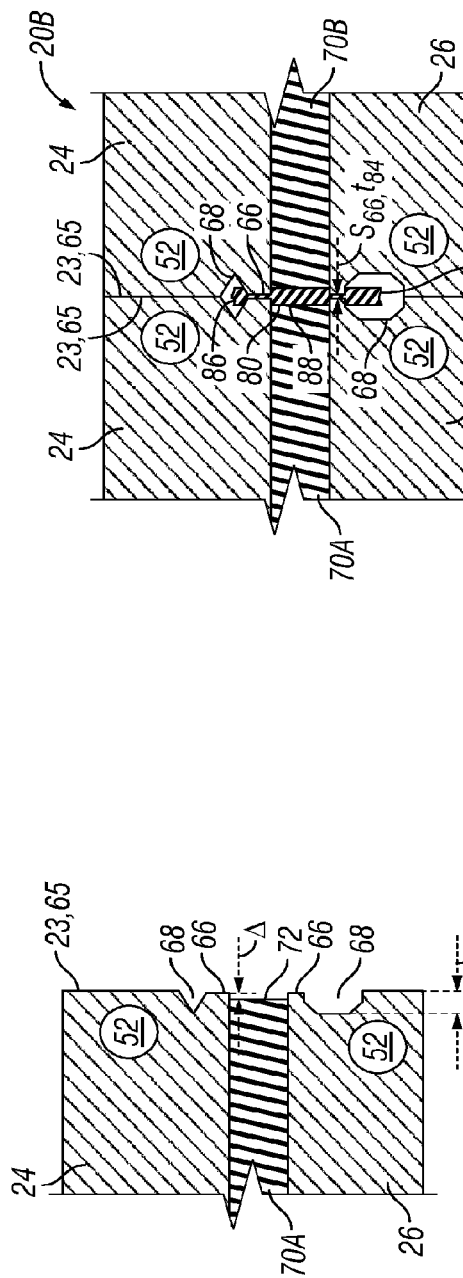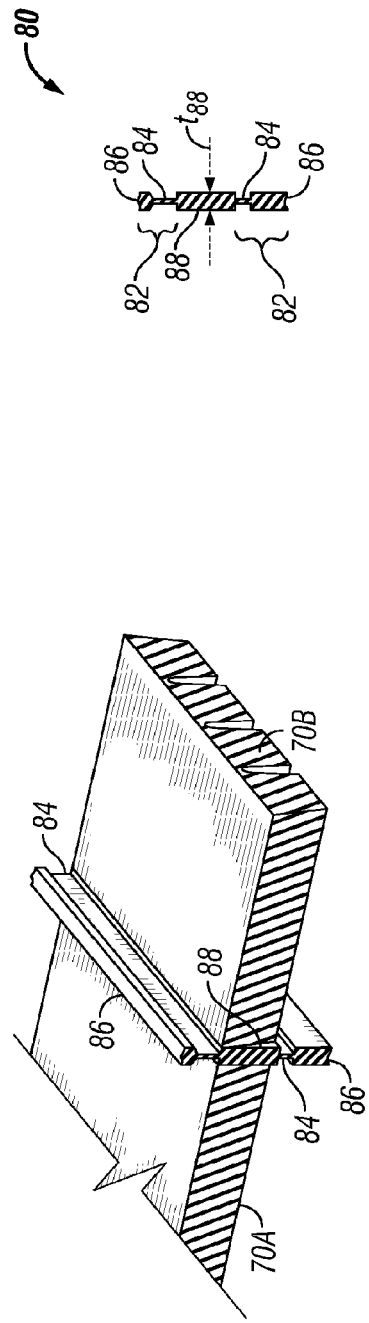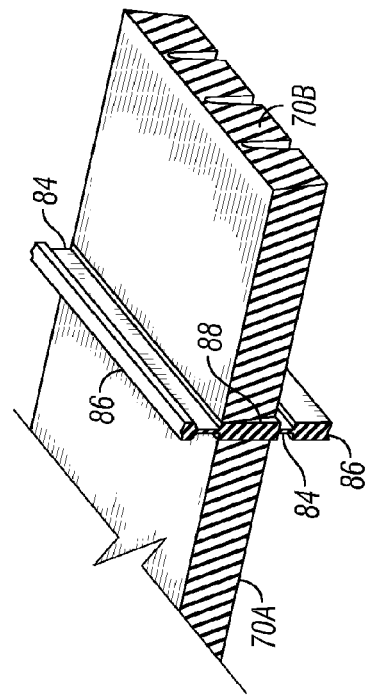

METHODS AND APPARATUS FOR JOINING TREADS

This patent application is a continuation of U.S. patent application Ser. No. 14/114,695, filed Oct. 29, 2013 with the US Patent Office, which is a national stage entry of International Patent Application No. PCT/US2011/042537, filed Jun. 30, 2011 with the US Receiving Office, which claims priority to U.S. Provisional Patent Application No. 61/481,194, filed Apr. 30, 2011 with the US Patent Office, all of which are hereby incorporated by reference.

BACKGROUND OF THE INVENTION

Field of the Invention

This invention relates generally to methods and apparatus for forming joints along treads, and in particular instances, joining tire tread portions to form joined tire treads, such as tread rings, for tire manufacturing operations.

Description of the Related Art

It is known to apply treads to new and used tire carcasses. Treads are applied to green tire carcasses in new tire manufacturing operations. Treads are also applied to used tire carcasses during tire retreading operations. In retreading operations, for example, treads may be formed and joined to form a ring about the tire carcass.

Current retreading methods include arranging elastomeric material between opposing ends of the tread and filling a gap between the ends to form the joint. In such instances, the opposing tread ends may be stapled together to maintain the ends in a closed arrangement for curing operations. The retreaded tires are then inserted into a flexible curing membrane and cured under vacuum pressure in a curing vessel. Subsequently the staples are removed. The resulting tread joint is often readily noticeable to an observer. This is in part because the joint comprises a noticeable gap filled with elastomeric material that is generally unconstrained during the curing process, whereby an uneven or non-smooth joint is formed. Further, the cured tread typically includes markings indicating the prior use of staples.

A current splice joint method may also be employed to join treads, whereby ends of a tread are joined by placing elastomeric joining material between the tread ends and subsequently placing the joined tread into a flat mold. In such methods, the tread joint is simply encapsulated by the mold and formed by pressure generated by compressing the tread joint within the mold. Because the mold is a typical mold used to originally form the tread, no unique features are provided for the joining operations, and therefore, joining material is unable to escape the mold. Therefore, any excess joining material is consumed and molded into the tread, which creates an oversized portion of the tread. Accordingly, the resulting tread joint may not be aesthetically pleasing as it varies is size and shape from the remaining portions of the tread. This is due to the inability to sufficiently control the formation of the joint.

Another current method of retreading includes forming a jointless, continuous tread ring using a molding process. The ring is then applied to the tire carcass and cured in a curing membrane within a curing vessel. Because the tread is free of any joint, this method provides an aesthetically pleasing tread. However, because this method employs a tread ring mold, the method can be very costly.

Accordingly, there is a need to provide a joined tread ring that is similar in cosmetic quality to molded tread rings by employing improved tread splicing methods and apparatus without the excessive costs associated with tread ring molds.

SUMMARY OF THE INVENTION

Particular embodiments of the present invention include methods and apparatus for joining treads. Particular embodiments of such apparatus include a first tread end retention member configured for retaining a first tread portion and a second tread end retention member configured for retaining a second tread portion. Each retention member comprises a body containing a tread retention chamber. The chamber is configured for retaining the corresponding tread portion and extending in a lengthwise direction from an aperture arranged along a joint side of the body. The aperture is defined by a perimeter surface extending substantially about a perimeter of the aperture. In particular embodiments, the first and second tread end retention members are configured to operate between open and closed arrangements, where in the closed arrangement the joint sides of the first and second tread end retention members are in a generally abutting arrangement to form a die about the apertures for use in forming a joint between opposing terminal tread ends retained within the retention members. The die extending approximately about a perimeter of each aperture and being formed by opposing perimeter surfaces of closely arranged and oppositely aligned apertures of the first and second tread end retention members. When in the in the open arrangement, the die is in a separated, open arrangement.

Particular embodiments of the invention include a method for joining treads. Such methods may include the step of providing a first tread portion and a second tread portion for forming a joined tread, each tread portion comprising a section of tire tread extending lengthwise from a terminal end. Such methods may also include the step of securing the first tread portion into a first fixture and securing the second tread portion into a second fixture, each of the first and second fixtures being arranged within the first and second fixtures such that the terminal end of each tread portion is in communication with a joining side of each fixture. Further, such methods may include the step of arranging an elastomeric joining material of a desired thickness between the terminal ends of each first and second tread end. An additional step may comprise forming a joint between the tread ends by directing the terminal ends towards each other and into forceful engagement with the elastomeric joining material to form a joint between the tread portions, whereby the fixtures form a die about a perimeter of the joint, an inner profile of the die substantially matching the outer profile of each terminal tread end.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 9 is a side sectional view of the body of the first tread end retention member arranged in a closed, tread-restraining arrangement according to an exemplary embodiment of the invention;

FIG. 10 is a sectional view of the tread end retention members arranged in a closed, tread joining arrangement to form a joined tread, the closed arrangement being a generally abutting arrangement of the tread end retention members according to an exemplary embodiment of the invention;

FIG. 11 is a perspective view of the joined tread of FIG. 10 showing the first and second tread portions arranged in the same longitudinal or lengthwise direction;

FIG. 12 is a sectional view of the tread joint shown in FIGS. 10-11.

DETAILED DESCRIPTION OF PARTICULAR EMBODIMENTS

Particular embodiments of the present invention include methods for joining a tread, and in other embodiments a tread joining device. The methods and devices disclosed herein are used to join two opposing tread portions to form a joined tread. As a result of employing the methods and devices of the invention, a more aesthetically pleasing joint is obtained in a manner different from existing technology. Further, any excess joining material may be generally discharged from the joint in a controlled manner for easy collection and removal from the joined tread.

Such methods for joining ends of a tire tread may include the step of providing a first tread portion and a second tread portion for forming a joined tread, each tread portion comprising a section of tire tread extending lengthwise from a terminal end. Generally, the tread portions are lengthwise portions of a tread for application to a tire carcass, the tread portion having a width and a thickness. In particular embodiments, the tread portion comprises a tread having a tread pattern on a ground-engaging side of the tread. The tread pattern may include any known tread features, including lugs and/or ribs separated by grooves and/or sipes, for example. The first and second tread portions may be associated with the same tread (i.e., different portions or segments the tread) or with separate and distinct treads. For example, the terminal ends of a single tread may be joined to form a continuous tread ring. By further example, separate treads (i.e., tread segments, sections, or lengths) may be joined to form a single unitary tread comprising multiple joined tread segments. The tread portion provided may be at least partially or fully cured, although a green or uncured tread portion may be employed.

The terminal end of the tread portion forms the end of the tread and includes an end surface. In particular embodiments, the terminal end surface comprises a cross-sectional surface of the tread extending laterally across the tread width and having a height extending through the thickness of the tread. The terminal end surface may extend across the width of the tread in a direction normal to the lengthwise direction of the tread or at any other angle biased to the lengthwise direction. Further, the terminal end surface may extend laterally in a linear or non-linear path. Likewise, the height of the terminal end surface may extend through the tread thickness in any direction, including a direction normal to the lengthwise direction of the tread, for example, and in any linear or non-linear path. Because the tread may include a tread pattern extending into the thickness of the tread, the tread end surface may include voids arranged within the tread thickness and arranged inwardly from an outer cross-sectional profile.

Figure 7A:
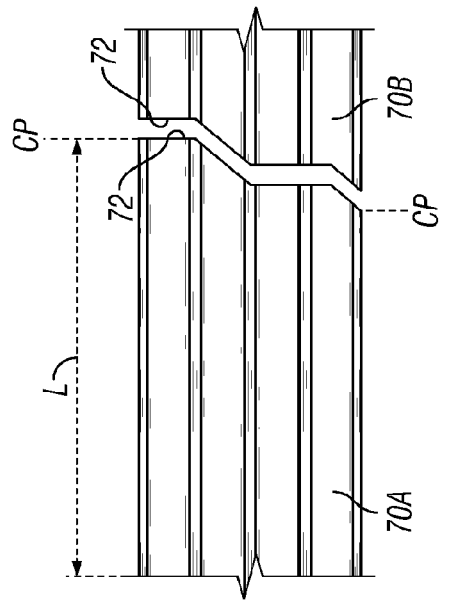
FIG. 7A is a bottom view of the first and second tread portions showing a ground-engaging side of each tread portion, such side including a tread pattern with tread features, the figure showing a linear cut path CP-CP along which the first tread portion is cut to form a terminal end of the tread portion for use in tread joining operations, the cut terminal end being formed to generally match the terminal end of the second tread portion where the first and second tread portions are arranged in the same longitudinal or lengthwise direction, according to an exemplary embodiment.

In particular embodiments, such methods may include the step of forming a terminal end of at least one of the tread portions. Any method known to one of ordinary skill in the art may be used to form any terminal end extending laterally in a widthwise direction of the tread in any linear or non-linear path, which is exemplarily shown in FIGS. 7A and 7B. For example, the terminal end may be molded or formed by removing an unnecessary portion of the tread by any known removal means, such as by cutting, lacerating, stamping, pressing, or any other removal technique. A cutting or lacerating removal means may include, for example, using a saw blade, a heated blade, a water jet, a laser, or a knife. The removal means may be controlled manually or automatically by a controller, such as by a programmable logic controller or a computer numerical control (CNC) machine, each of which may include a processor and a memory storage device for storing computer-readable instructions and/or data. In particular embodiments, the lengthwise location at which the terminal end is formed along each tread portion is selected to provide a terminal end having a profile that generally match the profile of the other terminal end to which it will be joined. For example, terminal ends may be selected and formed or otherwise provided that generally match (i.e., their cross-sections, profiles or perimeter generally match). This provides a tread joint that is consistent with adjacent portions or features of the joined tread and the overall tread pattern of the joined tread. In other words, by forming the terminal ends to generally match with elastomeric joining material arranged there between, the joined or assembled tread may include a tread pattern that is not substantially disrupted at the joint where the tread features of opposing terminal ends are generally aligned relative to a height (i.e., thickness) and width of the tread.

The arrangement of the terminal tread ends and the joining material there between provides a joined or assembled tread. In particular embodiments, the joined tread portions extend generally in the same lengthwise direction, which may extend linearly as a tread strip or annularly in the form of a tread ring. In certain embodiments, determining the location along any tread length at which to form the terminal end may be selected not only to generally match a terminal end of the tread portion to be joined, but also to select a location allowing the tread to properly mate with a particularly designed chamber and/or cavity within which the tread portion will reside. For example, the chamber and/or cavity may include structure to mate with particular tread features arranged along a ground-engaging surface that may correspond to a particular tread pattern.

It is possible that when determining a location to form a terminal end along a length of tread that generally matches another terminal end, the resulting tread length between terminal ends does not provide a tread ring having a desired circumference. In such scenarios, it may be possible to select another location along the tread length for forming the terminal end. In such situations, it may be desired to select a location that results in a tread ring having generally matching terminal ends that is smaller in circumference (or diameter) than desired, as opposed to a tread ring having a larger circumference or diameter. This is when the tread ring having a smaller diameter may be expanded to achieve the desired tread ring circumference or diameter. If the resulting tread ring is larger than desired, the tread ring may be sufficiently oversized such that the tread ring is usable with a particularly sized tire carcass—unless performing operations to reduce the ring diameter with tread material removal.

"Generally matching" terminal tread ends connotes terminal tread ends that, if arranged opposite each other in the same lengthwise direction such that the lateral cross-section of each terminal end is extended in the lengthwise direction to intersect at a central location or plane, the cross-sectional profile or perimeter of each tread end would generally match the other along the central plane in size and shape. In particular embodiments, with reference to the example in FIGS. 7A, 7B, and 10, "generally matching" terminal ends comprise terminal end surfaces that are offset in a lengthwise direction by a constant spacing (or may substantially engage or mate with each other if placing the opposing ends into abutting engagement), whereby elastomeric joining material of constant thickness may be employed to substantially engage both terminal end surfaces during joint formation. Exemplary thicknesses of the elastomeric joining material may be approximately 2 to 1.5 millimeters (mm) or less, which may be reduced to approximately 1 mm or less upon joint formation. In such embodiments, the offset between terminal ends that generally match is approximately 2 mm or less, 1.5 mm or less, or 1 mm or less. In other embodiments, "generally matching" terminal ends may comprise terminal end surfaces that are asymmetrically offset (i.e., not offset a constant or symmetrical distance) from each other when arranged in a lengthwise direction, whereby elastomeric joining material of variable thickness may be employed to substantially engage both terminal end surfaces during joint formation. "Generally" matching means that some minor, insubstantial, or small variation may exist between the lateral cross-section and at least one of the lateral cross-sections of the tread portions. For example, in particular embodiments, this may arise due to manufacturing imperfections and variations or slight misalignments. By further example, it may be impractical to provide opposing tread end surfaces that exactly match, such as when the treads have more complex tread patterns with tread features that may be difficult to match or tread features that may not remain within the tread portion length provided for joining. Still, by providing generally matching terminal ends, the corresponding tread portions are able to be retained within the tread-retaining cavity of any fixture, where such cavity has protrusions or other structure generally arranged to mate with tread features arranged along the retained tread portion.

To promote adhesion with the elastomeric joining material, the tread end surface is a rough or non-smooth surface. Accordingly, in particular embodiments, such methods include the step of roughening the tread end (i.e., terminal end) for receiving the tread joining material. Any known means of roughening the surface may be employed. For example, the surface may be abraded by any known means, such as sanding or grinding. By further example, roughening the tread end and its surface may be achieved by molding texture into the tread end surface. It is understood that the steps of forming terminal end and the step of roughening the tread end may be performed concurrently, such as when the forming operation also provides a roughened (i.e., non-smooth) tread end and tread end surface. For example, means for achieving these steps concurrently may be achieved by any known means for cutting the tread end while also providing a rough or non-smooth cut surface, such as when using a water jet cutting operation (i.e., using a water jet or stream to abrade and effectively cut a tread end and tread end surface). Therefore, the step of forming a terminal end may include the step of roughening the terminal end surface of at least one tread portion.

In addition or in lieu of roughening the terminal end of any tread portion, freshly formed or cut elastomeric joining material may be used to promote adhesion between the elastomeric material and any terminal tread end. This is beneficial when the tack or adhesion of the joining material decreases over time, such as due to oxidation. Freshly formed or cut means that the joining material was formed or cut within a certain period of time prior to use. For example, freshly formed or cut may mean formed or cut within 1 hour of use, but this will depend upon the formulation of elastomeric material used. The reduction in tack or adhesion may be retarded by refrigerating or otherwise storing in a cool environment.

Such methods may further include the step of securing the first tread portion into the first fixture and securing the second tread portion into the second fixture, each of the first and second fixtures being arranged within the first and second fixtures such that the terminal end of each tread portion is in communication with a joining side of each fixture. It is understood that the first and second fixtures are configured to retain a tread portion therein for the purpose of generally resisting forces associated with joint forming operations may be employed. In particular embodiments, opposing terminal ends of the first and second tread portions are forced towards each other with elastomeric material arranged between the terminal ends to form a joint. Accordingly, compression forces (i.e., pressure) may be applied to the elastomeric material and against each terminal tread end during these operations, whereby each fixture generally facilitates these joining operations and the generation and/or maintenance of these compressive forces (at least partially acting in a lengthwise direction of each tread portion) by sufficiently retaining the tread portion therein.

Any means for securing may be employed to retain each tread portion within a fixture. For example, at least a segment of a tread portion may be enclosed within a fixture chamber or aperture to be secured by compressive forces action about a cross-section of the tread portion (i.e., being squeezed within the fixture). This may be achieved, for example, by providing within a fixture a tread retaining chamber, the chamber having a volume that is less than the volume of tread that it will receive. In such embodiments, as the body closes about the chamber, the tread is secured within the chamber as it is compressed into the chamber during closure. The body may close by non-linear or curvilinear rotation and/or by linear translation, each of which may be achieved by any known means for opening and closing the body between open and closed arrangements. For example, such opening and closing means may include a linear drive, any motor in combination with a means for transmitting the drive force, such as gears, chains, belts, or the like, or one or more hydraulic or pneumatic cylinders. The opening and closing may be performed manually, at least semi-automatically, or automatically. Additionally, or in the alternative, for example, each tread portion may be secured within a closed arrangement within each fixture by any known means, such as by one or more pneumatic or hydraulic cylinders, clamps and/or fasteners.

Each fixture is further configured to expose a terminal end of the retained tread portion for engagement with elastomeric joining material to create the joint between tread portions. In particular embodiments, at least one of the tread portions is arranged within a fixture such that the terminal end is recessed by any desired distance into the fixture from the joining side of the fixture. For example, a terminal end may be recessed by an amount less than the thickness of the elastomeric joining material provided. For example, the recessed distance may be less than 2.5 mm, 2.0 mm, 1.5 mm, 1.0 mm, or 0.5 mm, from a joining side or joining side aperture of the fixture. By recessing the terminal end within the fixture, elastomeric joining material arranged between terminal ends may be positioned at least partially within the fixture adjacent the recessed terminal end. Exemplary fixtures for use in performing this step of securing are discussed in more detail below in conjunction with the figures provided. Alternatively, it is understood that the terminal end of each tread portion may not be recessed from a joining side of the fixture or aperture, and instead may be generally flush therewith or protrude outwardly there from, such as less than the thickness of the elastomeric joining material. In any embodiment, the terminal end may be pre-heated or adhesive applied before applying any elastomeric joining material to the terminal end to increase tack or adhesion.

Such methods may further include the step of arranging an elastomeric joining material of a desired thickness between the terminal ends of each first and second tread end. Elastomeric joining material is provided to join the first and second tread portions by their terminal ends. The joining material may be applied to the terminal end of any tread portion, which may or may not be recessed from a joining side of a fixture retaining such tread portion. The joining material may at least be arranged between opposing terminal tread ends to be joined. The joining material may comprise any elastomeric material that may be cured to form a final tread. The elastomeric material provided may be uncured or partially cured. Further, an amount of elastomeric material is generally provided to cover each tread end surface upon formation of a joint between each opposing tread end. Accordingly, in particular embodiments, the elastomeric material may be sized to generally cover each of the tread end surfaces. For example, the cross-sectional shape and size of the elastomeric material may be sufficient to cover at least one or both tread end surfaces. In other embodiments, in lieu of providing elastomeric joining material, a permanent or curable adhesive may be arranged between the terminal ends of the first and second tread portions. Any of the terminal tread ends and/or the elastomeric joining material may be pre-heated before applying the joining material to such terminal tread end. This may promote adhesion between adjoining surfaces and/or improve curing of the joint after joint formation.

The elastomeric joining material provided has a thickness. In embodiments where the joint is formed by compressing elastic joining material between the terminal ends, the thickness of the elastomeric joining material provided may be greater than the thickness of the final joint, each of which may be any thickness. For example, the elastomeric joining material provided may have a thickness of approximately 2.5 mm or less, 2.0 mm or less, or 1.5 mm or less, while the final joint may be approximately 1.0 mm or less. The thickness is bounded by opposing faces for separately engaging the terminal ends of the first and second tread portions. Such thickness may comprise any desired thickness, which may be constant or variable. The thickness is generally configured to mutually engage both opposing tread end surfaces and form a desired joint between the first and second tread portions, the joint thickness extending in a lengthwise (i.e., longitudinal) direction of each tread portion, where such lengthwise direction may extend linearly or in a non-linear path, such as an arcuate path to form a ring, for example.

Such methods may further include the step of forming a joint between the tread ends by directing the terminal ends towards each other to forcefully engage the elastomeric joining material and form a joint between the tread portions, whereby the fixtures form a die about a perimeter of the joint to substantially enclose the joint when in a closed arrangement, an inner profile of the die substantially matching the profile of each terminal tread end. The step of forming provides a joined tread whereby the tread ends are arranged generally end-to-end with a joint arranged between the terminal ends. The joint comprises tread joining material having a thickness extending in a lengthwise direction of the first and second tread portions, where the lengthwise direction may be linear or non-linear. While the joint thickness may be any desired thickness, in particular embodiments the joint is 1.0 mm or less, or in the alternative 3.0 mm or less, 2.0 mm or less, or 1.5 mm or less. In such arrangement, the first and second tread portions generally extend in the same lengthwise direction. The joint also has a cross-section or profile (i.e., perimeter) that generally matches the cross-section or profile of each adjacent tread end surface. "Generally" matches means that some minor, insubstantial, or small variation or misalignment may exist between the joint and the terminal end surfaces, which may arise due to manufacturing imperfections and variations or when it is be impractical to provide opposing tread end surfaces that exactly match each other or the die, but instead are substantially close. In particular embodiments, substantially enclosing the joint and generally matching the adjacent tread end surfaces is achieved when the die approximately circumscribes a perimeter of each terminal tread end.

In the step of forming a joint, directing the terminal ends towards each other to forcefully engage the elastomeric joining material may be achieved by any known means, which is discussed in more detail below in conjunction with the figures provided herewith. For example, one or more clamps, motors with gears or belts, pneumatic or hydraulic cylinders, and/or screw drives may be employed to direct the fixtures and/or terminal tread ends toward each other. It is understood that both fixtures may move, or one may move while the other remains static.

The die generally separates an excess portion of the elastomeric joining material displaced or discharged from the joint. This generally occurs when the die forms as the terminal ends close upon each other. In particular embodiments, the die directs the excess joining material outwardly from the joint to form a thin extension of joining material, which may also be referred to as flash. This thin extension may have any desired thickness, and may comprise a thickness approximately equal to 0.05 mm or less, 0.04 mm or less, or 0.03 mm or less, for example, while larger thicknesses may be employed. The thin extension may be formed when the fixtures are in a substantially closed arrangement and/or when the die is in a substantially closed arrangement, and may extend about a substantial perimeter of the joint. In further embodiments, the die further directs the excess portion of elastomeric joining material into a recess of the die to form a collected portion of joining material beyond the thin extension. In certain instances, the collected portion may have a width greater than a width of the thin extension of joining material. In operation, formation of the thin extension and/or the collected portion of excess joining material viewed as a stamping operation, where the excess material arranged outside the perimeter of the joint is manipulated within the die as the die is closed during joint forming operations. Accordingly, the die may form in certain instances a discontinuity or separation along at least a portion of the thin extension as a portion of each fixture engages or abuts within the die. The discontinuity may occur when the first surface generally engages the second surface. This engagement may be viewed as a stamping or cutting operation.

In the step of forming a joint, the fixtures form a die about a perimeter of the joint to substantially enclose the joint when in a closed arrangement, an inner profile of the die substantially matching the profile of each terminal tread end. In the closed arrangement, the fixtures are in a generally abutting arrangement to form the die, which means that the fixtures may abut along a joining side or be closely arranged to sufficiently separate the joint from any excess elastomeric joining material. The die may comprise any known die configured to create the joint claimed, including the die disclosed below and shown in the figures provided herewith. For example, the die may comprise a first surface at least partially forming a perimeter about the first fixture aperture and a second surface at least partially forming a perimeter about the second fixture aperture. In particular embodiments, at least one of the first surface and second surface forms the terminal surface of a ridge. The ridge allows excess joining material to flow from the joint during the step of forming the joint. In particular instances, the ridge may be arranged adjacent a recess for receiving excess joining material during tread joining operations, the recess being arranged along a side of the ridge opposite a perimeter of the aperture.

Such methods may further include the step of at least partially curing the elastomeric joining material within the joint. After the joint is formed, the joint comprising the elastomeric joining material is at least partially cured to stabilize the joint. In particular embodiments, the joint is approximately fully cured. Any heating means for at least partially curing the joint may be employed to perform these steps. For example, such means may comprise electric heaters arranged near the joint. At least one of the fixtures, or at least the portion of each such fixture nearest the terminal end (including the terminal end), may be pre-heated by the heating means or any other means separately or in addition to the heating means, such as to pre-heat any corresponding tread portion or terminal end to increase tack or adhesion between the tread and the elastomeric joining material upon application thereof. It may also be desirable to direct the heat only toward the terminal ends, for the purpose of minimizing the amount of heat applied to each tread portion.

Such methods may further include the step of removing the excess elastomeric joining material from the joint. In particular embodiments, excess joining material may be discharged from the joint. The excess material may be separated and removed from the joint to provide an aesthetically pleasing tread. The excess material may be separated and removed by any known means and at any juncture after the excess material has been discharged. For example, the excess joining material may be removed manually by hand or by use of any cutting or removal tool. By further example, the excess joining material may be removed upon discharge from the joint during the step of forming the joint or after the step has been completed, before or after performing the step of curing the joint.

Such methods may be employed for either manual or automated tread joint formation. Exemplary embodiments of a tread joining device for use in performing such methods are discussed in further detail below. The device(s) shown in the figures are only exemplary of any of a variety of tread joining devices that may be employed within the scope of this invention.

Figure 7B:
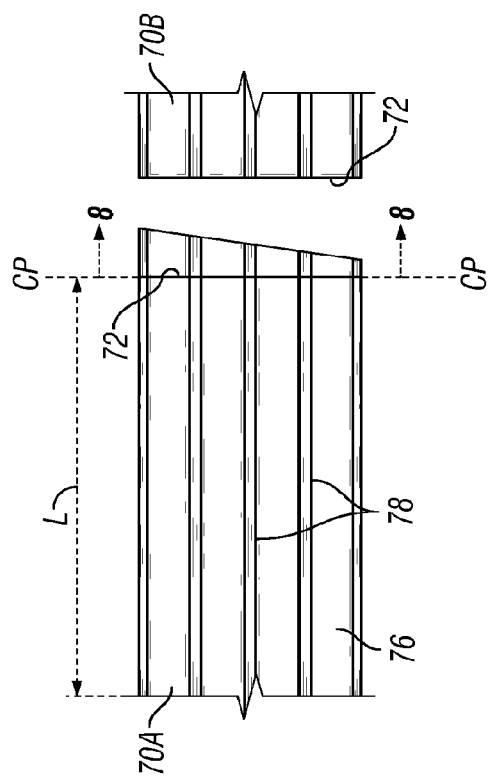
FIG. 7B is a bottom view of alternative first and second tread portions showing ground-engaging sides of each tread portion, such side including a tread pattern with tread features, the figure showing a non-linear cut path CP-CP along which the tread portion is cut to form a terminal end of the first tread portion for use in tread joining operations, where the first and second tread portions are arranged in the same longitudinal or lengthwise direction, according to a second exemplary embodiment.
Figure 8:
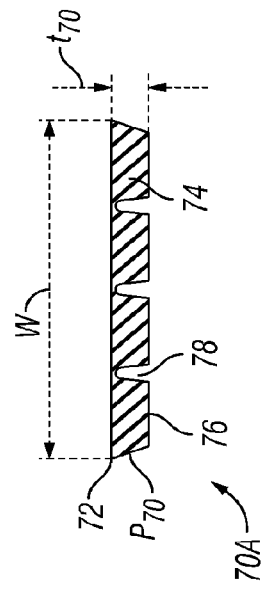
FIG. 8 is an end view of the tread portion shown in FIG. 7A taken along line 8-8 according to an exemplary embodiment of the invention.

With reference to FIGS. 1-6, a tread joining device is shown for joining tread ends. The exemplary device 10 includes a first tread retention member 20A (also referred to as a "first fixture") configured to retain a first tread portion 70A (shown in FIG. 2) and second tread retention member 20B (also referred to as a "second fixture") configured to retain a second tread portion 70B (shown in FIG. 2). With reference to FIGS. 7-10, each tread portion 70A, 70B includes a terminal end 72 having an terminal end surface 74 generally comprising a lateral cross-section of the tread, the cross-section having an outer profile $P_{70}$ extending about the perimeter of the end surface. The terminal end 72 may extend widthwise in a lateral direction of any tread portion 70A, 70B in a linear or non-linear path. For example, with reference to FIG. 7A, a terminal end 72 is formed along first tread portion 70A by cutting an excess portion there from along line CP-CP to form a tread portion having a length L, whereby the cut provides a linear terminal end arranged normal to the longitudinal (i.e., lengthwise direction) of the tread portion. In particular embodiments, the terminal end 72 is cut at a particular location along the tread length to provide a terminal end profile or perimeter that generally matches the terminal end profile of second tread portion 70B. With reference to FIG. 7B, non-linear terminal tread ends 72 are exemplarily shown. Tread joining device 10 forms a joint 88 (shown in FIGS. 10-12) between the first and second tread portions 70A, 70B, and more specifically, between the opposing terminal ends 72. As suggested above, first and second tread portions may be associated with the same tread (i.e., a single tread where each first and second tread portions are connected and the terminal ends form opposing ends of the single tread) or with separate treads (i.e., where the tread portions are not connected prior to performing the joining operations).

With continued reference to FIG. 1-6, first and second tread end retention members 20A, 20B each include a body or enclosure 22 having a tread-retention chamber 60 configured to retain therein a tread portion 70A, 70B. With exemplary reference to FIGS. 7-10 again, the terminal end 72 of each retained tread 70A, 70B communicates with a joining side 23 (also referred to as "joint side" herein) of each retention member 20A, 20B by way of an aperture 64 arranged along the joining side of the body. In particular embodiments, chamber 60 extends in a lengthwise direction from aperture 64. A perimeter surface 66 generally extends about the perimeter $P_{64}$ of each aperture 64, where the perimeter surface 66 either extends continuously or in separate segments (as exemplarily shown in FIG. 6) about the aperture. In particular embodiments, the perimeter $P_{64}$ of each aperture 64 generally matches a profile or perimeter $P_{70}$ of each tread portion (shown by example in FIG. 8). In particular embodiments, the aperture 64 cross-sectional profile $P_{64}$ generally matches the cross-sectional profile of each such tread portion. In operation, opposing perimeter surfaces 66 of opposing tread end retention members 20A, 20B close upon each other to sufficiently shape and mold joint 88, and in particular embodiments, a joint that is generally flush with the adjacent tread portions 70A, 70B and the perimeter of each corresponding terminal end. In particular embodiments, with reference to FIGS. 9 and 10, tread portions 70A, 70B may each be arranged within a chamber 60 such that the terminal end 72 is recessed inwardly from aperture 64 and joining side 23 by a distance Δ to receive a portion of elastomeric joining material for joint formation.

Because excess elastomeric joining material may be squeezed from the joint during the joining process, a die facilitating improved formation of joint and removal of any excess joint material is generally formed about the joint as the joint sides and apertures of opposing retention members are closed upon each other. For example, in the embodiment shown in FIGS. 4-6, 9-10, the perimeter surface 66 of at least one of the retention members 20A, 20B is arranged along a ridge 67 having an adjacent recess 68 extending about a substantial portion of the aperture perimeter $P_{64}$ to generally form a die and control the formation of the joint and the flow of the excess joining material 82 from the joint. In other words, the ridge 67 is arranged adjacent the aperture 64 and between the aperture and an adjacent recess 68 along the joint side 23 of the body. In such embodiment, the perimeter surface 66 forms the terminal surface of the ridge. The perimeter surface generally has a width W extending from the aperture, which may be any desired value. In particular embodiments, the perimeter surface width $W_{66}$ may be sufficiently narrow to form an edge along the ridge, which may be used to cut the excess material from the joint as the die closes. In other embodiments, such as is shown, perimeter surface 66 along ridge 67 has a narrow yet noticeable width $W_{66}$, which may assist in increasing the stiffness of the ridge when engaging the joining material and/or an opposing perimeter surface 66 during joining operations. Otherwise, the ridge 67 may deform and/or become damaged due to elevated forces, pressures, or contact with an opposing ridge or joining material. In one example, the terminal surface 66 of ridge 67 has a width $W_{66}$ of approximately 1 mm. Of course greater or less widths $W_{66}$ may be employed. In addition to or in lieu of altering the width $W_{66}$, more durable or stronger material may be used to form ridge 67 and surface 66. For example, aluminum or steel may be employed.

Figure 5:
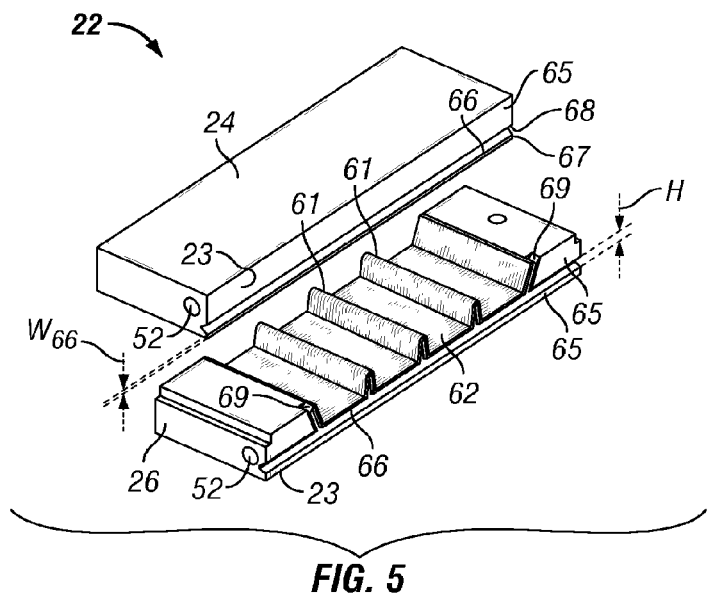
FIG. 5 is a perspective view of a body of a tread-retention member in an open arrangement according to an exemplary embodiment of the invention.
Figure 6:
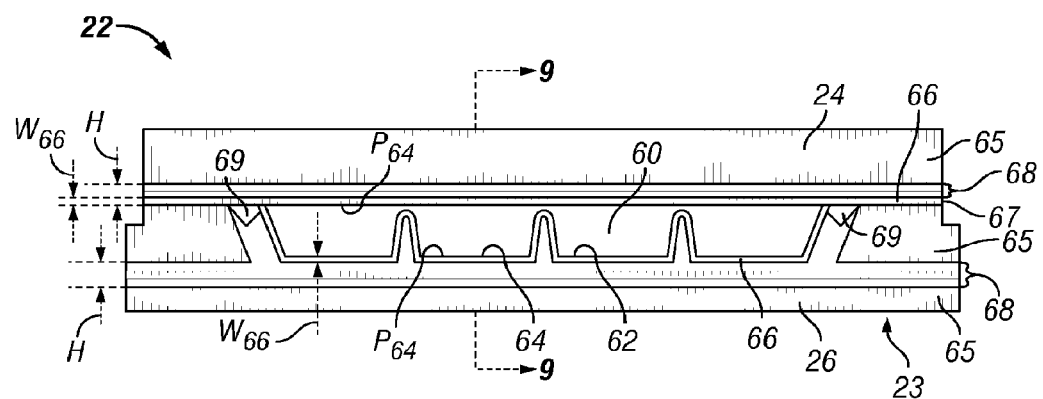
FIG. 6 is an end view of the body of a tread retention member arranged in a closed arrangement and showing the joining side of the body, according to an exemplary embodiment of the invention.

With continued reference to FIGS. FIGS. 4-6, 9-10, recess 68 extends from the perimeter surface or terminal surface 66 of the ridge 67 in an inward direction of the body by a depth D (see FIG. 9) and through a cross-section of the body by a height H (see FIG. 5). A secondary recess 69 may be located along the side edges of the tread portion (i.e., located at opposite sides of the tread width) along the joining side 23 to receive additional excess joining material. The secondary recess 69 may extend any desired length and have any desired cross-sectional shape. The recesses 68, 69 maybe designed to provide any desired volume for accepting excess joining material from the joint. It is understood that one or both (exemplarily shown in FIG. 10) of the tread retention members 20A, 20B may include a ridge and/or recess. It is further understood that, in particular embodiments, a perimeter surface 66 may extend from aperture 64 without any ridge 67 or recess 68, 69 while still achieving joint formation.

Use of the ridge and recess facilitates formation of an aesthetically pleasing joint and easy removal of any excess joint material unused by the joint. For example, with reference to FIG. 10, ridge 66 may direct the flow of excess joining material 82 from the joint and into an adjoining recess 68, 69. This may be accomplished by having ridge 67 generally pinch or cut the excess portion 82 from the joint 88 as the ridge and its surface 66 of one retention member 20A, 20B translates toward the perimeter surface 66 of the other retention member 20A, 20B when the joint sides of each retention member 20A, 20B close upon each other to place the retention members 20A, 20B in a closed arrangement. In the closed arrangement, opposing surfaces 66 may generally engage each other, meaning that any excess joining material collected in any recess 68, 69 is separated or at least partially separated from joint 88. In other embodiments, opposing surfaces 66 nearly engage (i.e., are closely arranged) in the closed arrangement, whereby a thin spacing $S_{66}$ exists between opposing surfaces 66 to form a thin extension 84 of excess joint material 82 extending from joint 88 and between any excess joining material 78 displaced into any recess 68, 69, if existing. These engaged or closely arranged closed arrangements, the first and second retention members 20A, 20B are in a generally abutting arrangement. The thickness $t_{84}$ of extension 84 may be any desired thickness, such as, for example, a thickness of 1 mm or less, 0.5 mm or less, 0.1 mm or less, or 0.05 mm or less. Accordingly, thickness $t_{84}$ also generally represents the spacing $S_{66}$ between opposing surfaces 66 when nearly engaged or closely arranged in the closed arrangement. In either variation, because the opposing surfaces 66 are closely arranged or in engagement, and because the surfaces are adjacent each aperture 64, the resulting joint is shaped or molded to be generally flush with the adjacent portions of each tread 70A, 70B, except for any excess joining material 82 extending outwardly there from in the form of a thin extension 84. Exemplary embodiments of the joined or assembled tread is shown in FIG. 11, and the joint 88 in FIG. 12.

Body 22 may comprise any structure configured to retain a tread. For example, with reference to the embodiment of FIGS. 1-6, body 22 may comprise a top section 24 and a bottom section 26. Sections 24, 26 may comprise plates or any other desired structure and may be arranged atop a bottom support 28, which facilitate replacement of sections 24, 26 from device 10, such as when the sections correspond to particular treads to being joined. Bottom support 28, however, may not be employed in other variations. In particular embodiments, the top and bottom sections 24, 26 form the tread-retaining chamber 60 in the closed arrangement, where at least one of the top and bottom sections include a cavity 62 at least partially forming or defining the tread-retaining chamber. While the exemplary embodiment shown only provides a cavity 62 in the bottom section 26, it is understood that one or more cavities may be arranged in either or both the top and bottom sections 24, 26. Therefore, it is understood that multiple cavities 62 may be employed to form chamber 60.

Body 22 may be formed of any desired material. For example, body 22 may be formed in whole or in part from steel or aluminum. In particular embodiments, body 22 may be generally formed of steel while the immediate portion forming chamber 60 or cavity 62 may be formed of aluminum. In particular embodiments, body 22 generally comprises a mold having a molding cavity used to form a corresponding tread portion having tread features. However, when the mold forms the tread portion under heat, the cooled tread portion may contract and not fit exactly within the molding cavity when returned to the mold. Therefore, in particular embodiments, body 22 may comprise a reduced variation of the original mold, whereby the tread-receiving cavity 62 (i.e., the molding cavity) is reduced by a desired percent from the original molding cavity, such as by 2-4% for example, to account for any cooling of the tread portion subsequent the molding thereof.

Figure 1:
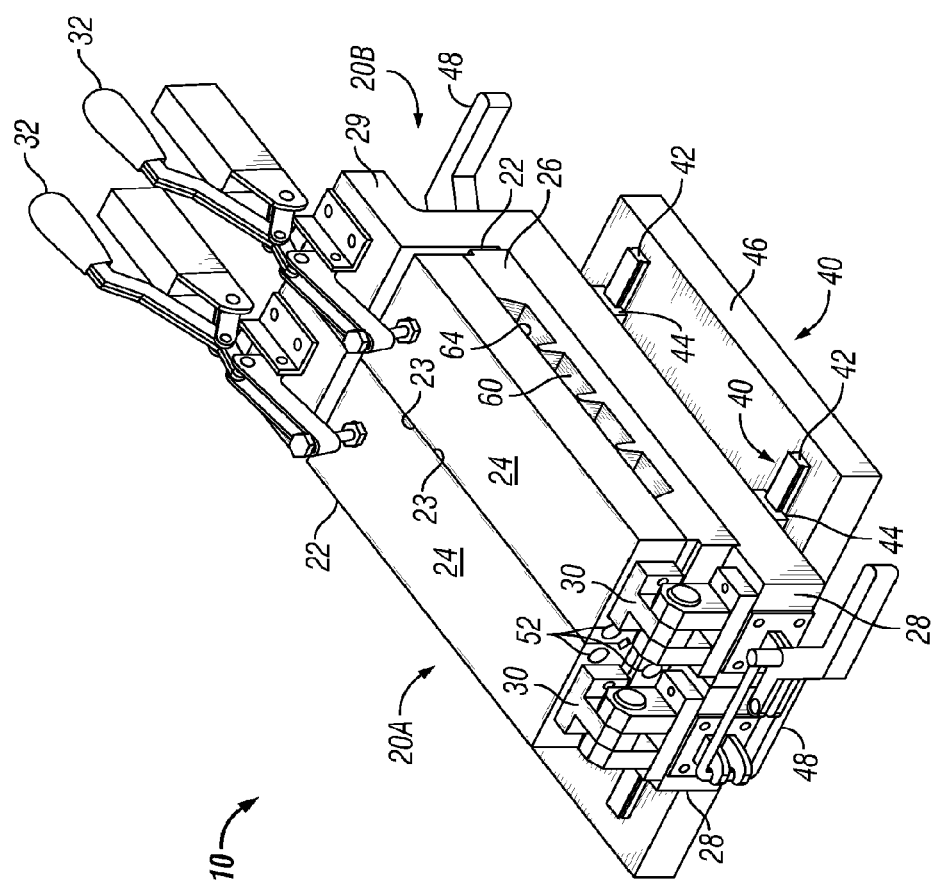
FIG. 1 is a perspective view of a tread joining device showing the tread-retention members arranged in a closed, tread joining arrangement according to an exemplary embodiment of the invention.
Figure 2:
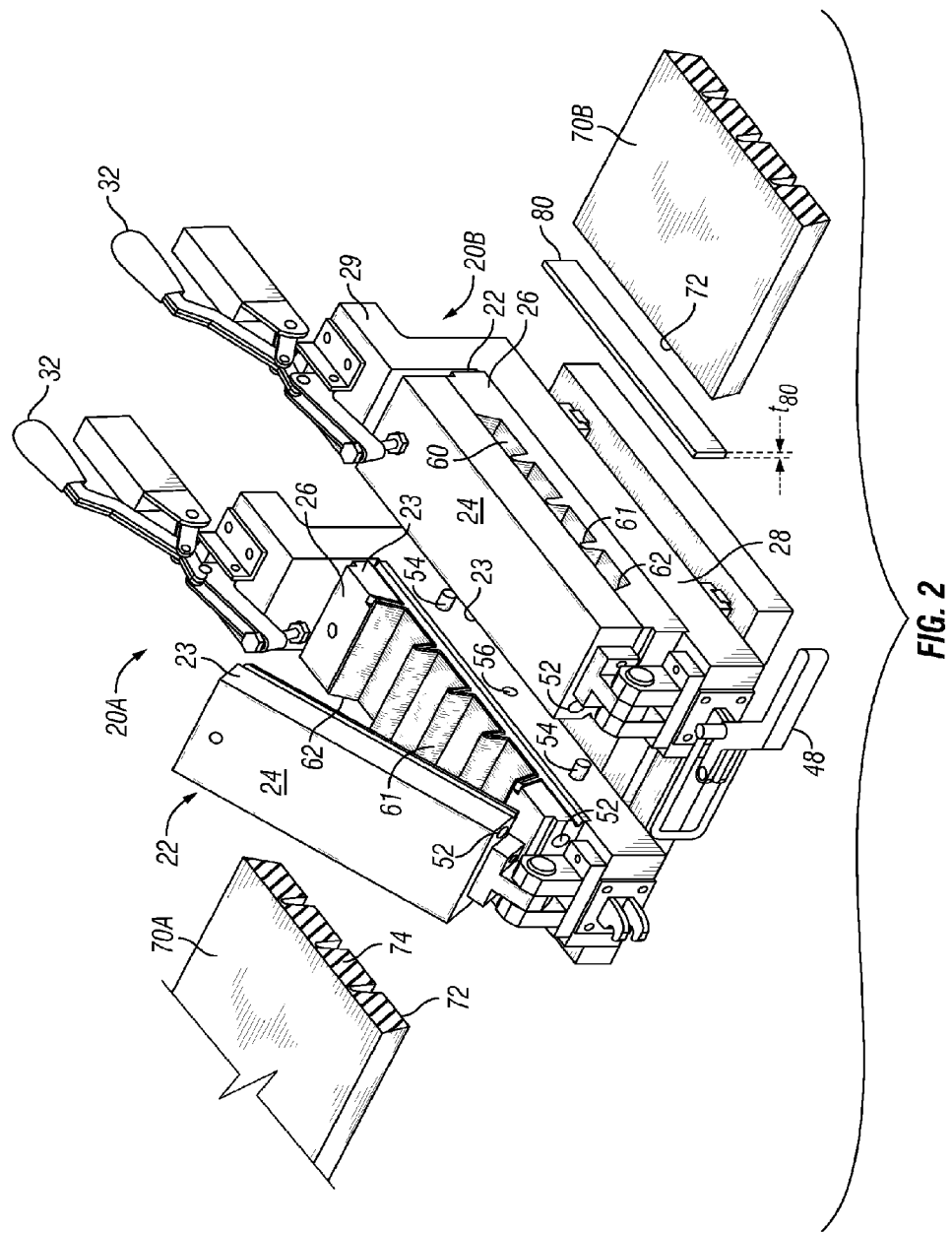
FIG. 2 is a perspective view of the tread joining device of FIG. 1 showing the tread-retention members separated in an open, pre-joining arrangement with one of the tread-retention members in an open, tread-receiving arrangement.

In particular embodiments, top and bottom sections 24, 26 are arranged to operate between open and closed arrangements. A closed arrangement is shown in FIG. 1, while an open arrangement is shown in FIG. 2. Operating between opened and closed arrangements may be achieved by any means for actuating the top and bottom sections 24, 26 between opened and closed arrangements known to one of ordinary skill in the art. Accordingly, device 10 may include a means for opening and closing the top and bottom sections 24, 26 of the tread retaining body 22. Any known means for aligning the top and bottom sections 24, 26 may be employed to ensure proper alignment of the top and bottom sections as the sections operate between open and closed arrangements. For example, such means may comprise guide pins with corresponding holes arranged on opposing sides of each section 24, 26 or tracks along which one or more of the sections 24, 26 translate. Further, device 10 may include a means for securing the top and bottom sections 24, 26 of the tread retaining body 22 in the closed arrangement. It is understood that any such means may facilitate manual or at least partial automatic opening and closing operations. Further, any such means may actuate any portion of body 22, including either or both top and bottom sections 24, 26, by any movement, such as rotational and/or linear translation, for example. With reference to the exemplary embodiment of FIGS. 1-4, a pivot 30 may be employed to facilitate rotatable actuation between open and closed arrangements of the top and bottom sections. By further example, one or more pneumatic or hydraulic cylinders maybe employed to rotate or translate top and/or bottom section. While any known means of securing may be employed, the exemplary embodiment utilizes a clamp 32. In the embodiment shown, clamps 32 are arranged atop a raised portion 29 of bottom support 28. It is also understood that means for opening and closing top and bottom sections may also comprise the means of securing.

Chamber 60 may be of any configuration or design. For example, chamber may represent any sized tread having any desired tread pattern, cross-section, and profile. With reference to the exemplary embodiment of FIGS. 1-6, chamber 60 is configured (i.e., shaped and sized) to retain a particularly designed tread having a tread pattern comprising tread features arranged on along a ground-engaging side of the tread. Such tread features may comprise, for example, lugs separated by or including grooves, sipes, or other voids. Accordingly, chamber 60 may include tread feature structures 61 particularly arranged to generally mate or integrate with a particularly designed tread having particular tread features. Tread structure 61 generally extends into chamber 60 from chamber outer walls generally representing the outermost profile of the tread. Still, in other embodiments, chamber 60 does not include tread mating structure 61. It is understood, however, that structure to mate with particular tread features may not exist in particular embodiments, and instead an general chamber comprising outer walls generally circumscribing the tread may be employed. Further, the chamber 60 may have a volume less than the volume of the tread portion to be received, such that the tread portion is retained in the body 22 as the chamber compresses the tread for securement therein.

As discussed previously, retention members 20A, 20B close upon each other generally cause tread portions 70A, 70B to engage elastomeric joining material arranged between the tread portions for forming a joint there between. Accordingly, device 10 may include a means for actuating first and second tread end retention members 20A, 20B between open and closed arrangements. It is understood that any means for actuating the retention members 20A, 20B between an open unjoined arrangement to a closed tread-joining arrangement known to one of ordinary skill in the art may be employed, which includes any manual, semi-automatic, or automatic method. For example, retention members may be actuated manually, by a motor with gears, belts, or the like, by way of one or more pneumatic or hydraulic cylinders, or by a clamp 48 as shown by example in FIGS. 1-4. Clamps 48 are shown arranged along sides of bottom support 28; however, clamps 48 may be arranged to be more in-line or co-planar with the joint 88. Therefore, for example, clamps 48 may be arranged along a side of body 22, such as along top or bottom section 24, 26. In the embodiment shown, the means for actuating includes track system 40 comprising rails 42 arranged along a base plate 46 and a rail guides 44 operably attached to each tread retention member 20A, 20B, and more specifically to bottom support 28 in the embodiment shown. In instances where bottom support 28 is not used, rail guides 44 may be attached to bottom section 26 for example. Rail guides 44 are configured to translate along a rail 42, such as by including a channel configured to receive the rail and to prevent removal of the guide from the rail during translation. Guides 44 may further include a bearing or bearing surface to facilitate improved translation along rail 42.

Device 10 may further include a means for securing the first and second tread end retention members 20A, 20B in the closed arrangement. For example, the means for securing may comprise one or more fasteners, hydraulic or pneumatic cylinders, or clamps. With reference to FIGS. 1-4, the means for securing comprises a pair of clamps 48. In particular embodiments, the means for securing comprises the means for actuating first and second tread end retention members 20A, 20B between open and closed arrangements. Further, any known means for aligning the first and second tread end retention members 20A, 20B may be employed to maintain the alignment of the terminal ends 72 of the opposing tread portions 70A, 70B as the members close during joint formation. For example, with reference to FIGS. 2-4, guide pins 54 and corresponding holes 56 may be arranged along the joint side 23 of each tread end retention members 20A, 20B, such as along the joint sides of body 22 or of body support 28. Guide pins 54 are arranged opposite a corresponding hole 56, such that as the retention members 20A, 20B close, each guide pin enters a corresponding hole 56.

Figure 3:
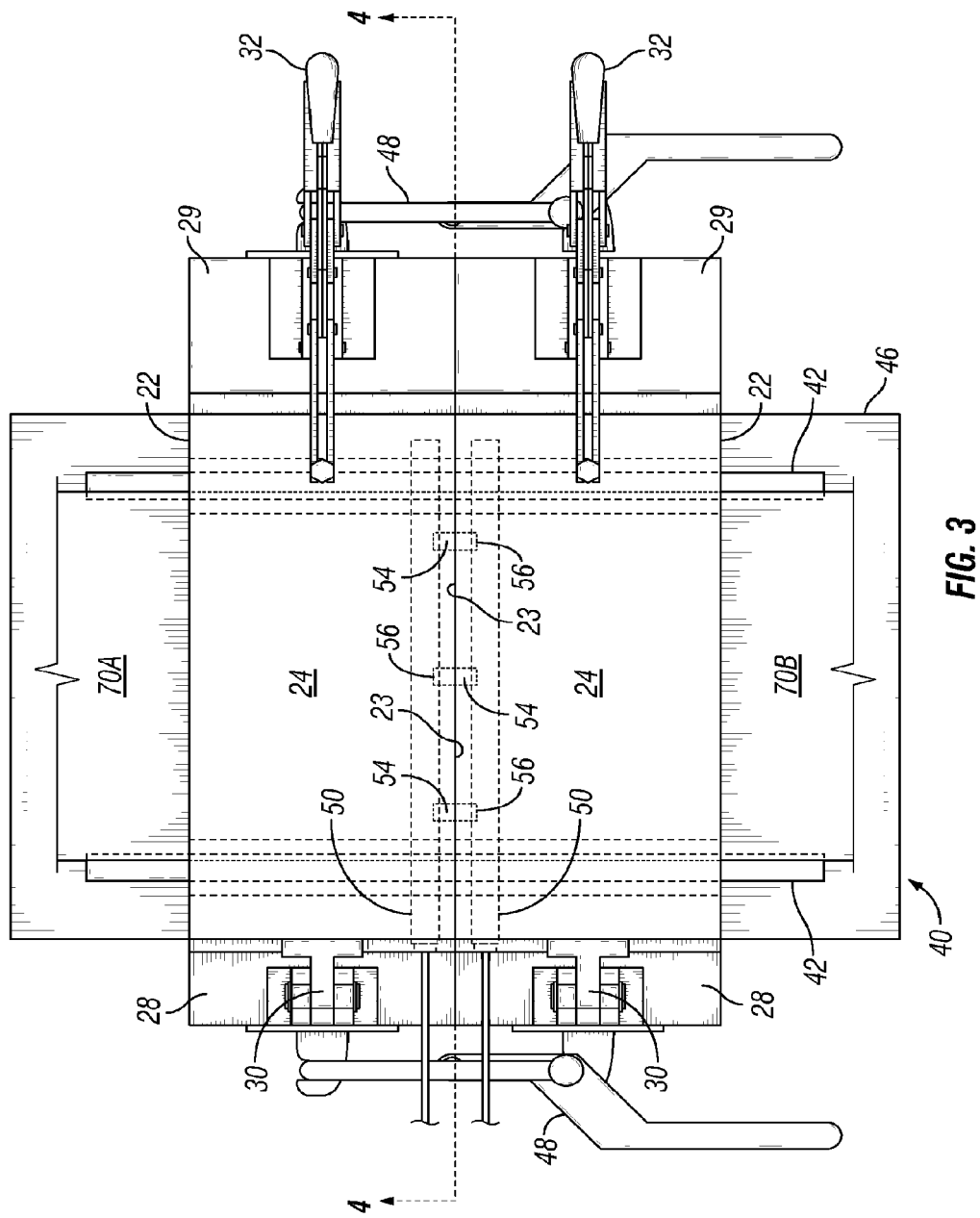
FIG. 3 is a top view of the tread joining device of FIG. 1 showing the tread joining device is a closed, tread joining arrangement.
Figure 4:
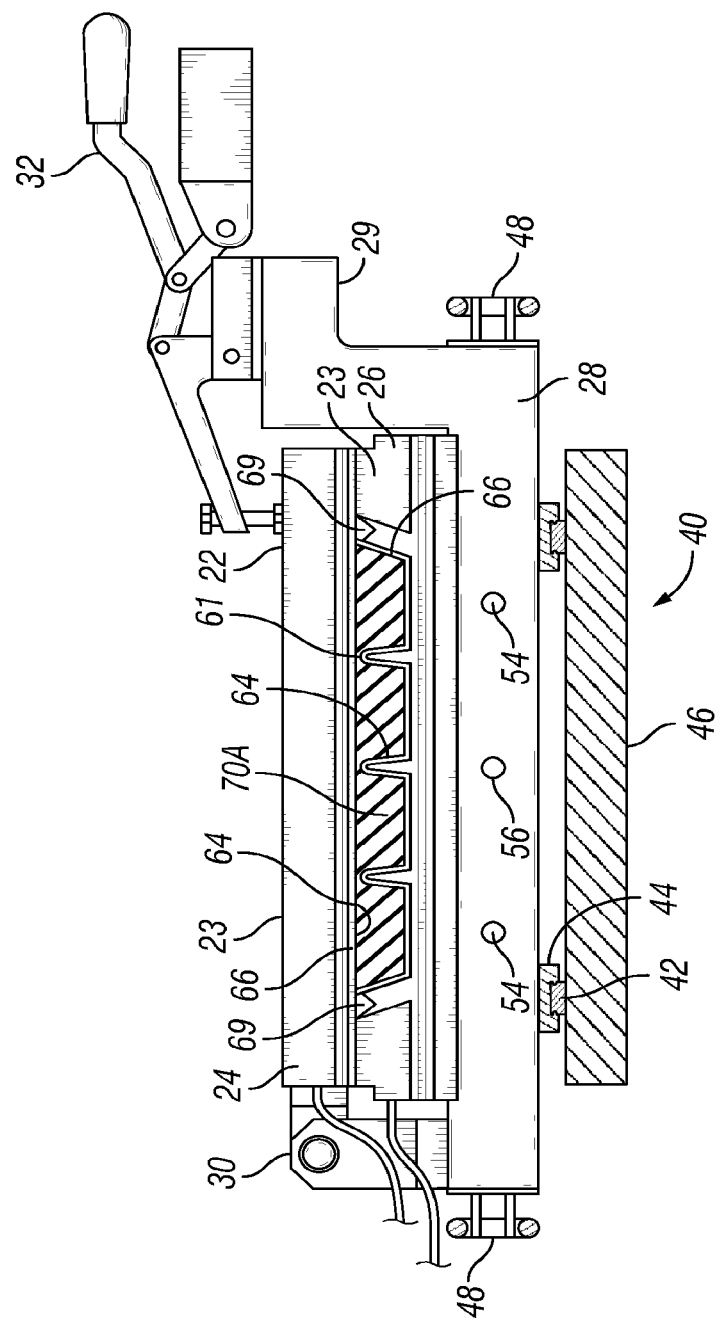
FIG. 4 is a sectional view of the tread joining device taken along the line 4-4 as shown in FIG. 3.

To control the limit or extent to which the retention members are closed may also be controlled by any known means. For example, each retention member 20A, 20B may include an abutment surface 65, where the abutment surface of each retention member engages an abutment surface when the retention members are in a closed arrangement. A exemplary closed arrangement is shown in FIGS. 1, 3, and 10. In the embodiments shown, the abutment surface forms a portion of an end surface 65 arranged along the joint side 23 of body 22. It is understood, however, that the abutment surface 65 comprise any surface, whether planar or contoured. Accordingly, abutment surface 65 may be associated with any other structure of body 22 or more generally with any other structure of retention member 20A, 20B. It is understood that while engagement is contemplated, true engagement may not occur to sufficiently control the closure and spacing between each retention members 20A, 20B, and more generally to sufficiently control the formation of joint 88. For example, one or more pneumatic or hydraulic cylinders may be employed to control the closing of the retention members 20A, 20B without any engagement between such retention members, whereby any desired spacing between the retention members may be provided. In such example, the stroke of any such cylinder may be selected or arranged to control the spacing between retention members 20A, 20B.

It is understood that the joint 88 and the elastomeric joining material 80 arranged therein may be partially or fully cured while being retained within device 10. Accordingly, one or both retention members 20A, 20B may include any known means for heating. The means for heating is arranged in close relation to the joining side 23 to direct heat toward the terminal ends 72 of any tread portion 70A, 70B retained therein. This may improve improved tack or adhesion along the terminal end 72 for receiving elastomeric joining material 80. Further, by directing heat toward the joining side 23, heat may be directed away from the remaining portion of each tread retention member 20A, 20B and the tread portion 70A, 70B retained therein as it may be beneficial to minimize any heating of the tread portions beyond their terminal end. For example, with reference to FIGS. 3 and 4, and more generally to FIGS. 1-4, heaters 50 may be arranged within device 10 to direct heat to the joining side 23 of one or more retention members 20A, 20B. In particular embodiments, the heaters 50 are arranged in close relation to the joining side 23, whereby the heaters extend along the joining side 23. For example, one or more heaters may extend lengthwise direction that is parallel to or 45 degrees or less from joining side 23.

Heaters may comprise any known heater, such as an electrical heating cartridge, for example, and may be controlled manually or automatically, in whole or in part, to direct a desired amount of heat for a desired duration according to a particular curing law to cure or partially cure the elastomeric joining material 80 within joint 88. In particular embodiments, at least one of the first and second tread end retention members 20A, 20B includes one or more heaters 50 arranged above the tread retention chamber 60 and/or aperture 64 and at least one of the first and second tread end retention members 20A, 20B includes one or more heaters 50 arranged below the tread retention chamber 60 and/or aperture 64, which is exemplarily represented in FIGS. 1-4. More specifically, in such embodiments, a heater 50 is arranged in top section 24 and in bottom section 26. It is understood, however, that a heater 50 may be arranged within body support 28 in lieu of or in addition to any heater arranged within bottom plate 26. Each heater 50 may be arranged within an aperture 52 arranged as desired within each tread retention member 20A, 20B, and any component thereof. More generally, one or more heaters of means of heating may be arranged about aperture 64 within body 22.

In operation, first and second tread portions 70A, 70B are each arranged and secured within a body 22 of corresponding first and second tread retaining members (i.e., fixture) 20A, 20B, respectively. Elastomeric joining material 80 is then arranged between opposing terminal ends of each tread portion 70A, 70B. The first and second tread retention members 20A, 20B are then actuated towards each other to engage each terminal end 72 against an opposing side of the elastomeric joining material 80. The elastomeric joining material 80 is then compressed to form a joint between the ends and any excess joining material 82 is captured by a die formed as the first and second tread retention members 20A, 20B are arranged into a closed arrangement, the die being formed as opposing surfaces of the retention members engage or become closely arranged to force any excess elastomeric joining material away from the joint. The joint may be partially or completely cured through the application of heat, and the joined tread subsequently removed from the device 10.

While this invention has been described with reference to particular embodiments thereof, it shall be understood that such description is by way of illustration and not by way of limitation. Accordingly, the scope and content of the invention are to be defined only by the terms of the appended claims.

What is claimed is:
1. A tread joining device comprising:
a first tread end retention member configured for retaining a first tread portion and a second tread end retention member configured for retaining a second tread portion, each retention member comprising a body containing a tread retention chamber, the chamber configured for retaining the corresponding tread portion and extending in a lengthwise direction from an aperture arranged along a joint side of the body, the aperture being defined by a perimeter surface extending substantially about a perimeter of the aperture, where the perimeter surface for at least one of the first and second tread end retention members forms the terminal surface of a ridge, the ridge extending outwardly from the joint side of the body in the lengthwise direction of the corresponding tread end retention member and being arranged between the aperture and a recess arranged along the joint side of the body, the recess configured for receiving excess tread joining material;
the first and second tread end retention members being configured to operate between open and closed arrangements,
where in the closed arrangement the joint sides of the first and second tread end retention members are in a generally abutting arrangement to form a die about the apertures for use in forming a joint between opposing terminal tread ends retained within the retention members, the die extending approximately about a perimeter of each aperture and being formed by opposing perimeter surfaces of closely arranged and oppositely aligned apertures of the first and second tread end retention members,
where in the open arrangement the die is in a separated, open arrangement.

2. The device of claim 1, where the joint side forms a terminal end of the body.

3. The device of claim 1, where in the closed arrangement the perimeter surface of each first and second tread end retention member engages the perimeter surface of the other first and second tread end retention member.

4. The device of claim 1, wherein the body comprises a top section and a bottom section, the top and bottom section arranged to operate between open and closed arrangements, wherein the top and bottom sections form the tread-retaining chamber in the closed arrangement.

5. The device of claim 4, wherein at least one of the top and bottom sections include a cavity at least partially forming the tread-retaining chamber.

6. The device of claim 1, wherein the perimeter of the aperture generally defines a profile of a tread for placement within the tread retention chamber.

7. The device of claim 1, wherein at least one of the first and second tread end retention members includes one or more heaters arranged above the tread retention chamber and at least one of the first and second tread end retention members includes one or more heaters arranged below the tread retention chamber.

8. The device of claim 1, where one or more guide pins are arranged along the joint side of the first and second tread end retention members and one or more corresponding holes are arranged along the other of the first and second tread end retention members, whereby each of the one or more holes is arranged to receive one of the one or more guide pins when the first and second tread end retention members are in the closed arrangement.

9. A method for joining ends of a tire tread, the method comprising the steps of:
providing a first tread portion and a second tread portion for forming a joined tread, each tread portion comprising a section of tire tread extending lengthwise from a terminal end;
securing the first tread portion into a first tread end retention member configured for retaining the first tread portion and securing the second tread portion into a second tread end retention member configured for retaining the second tread portion, such that the terminal end of each tread portion is in communication with a joint side of each tread end retention member, each retention member comprising a body containing a tread retention chamber, the chamber configured for retaining the corresponding tread portion and extending in a lengthwise direction from an aperture arranged along the joint side of the body, a perimeter surface extending substantially about a perimeter of the aperture, the first and second tread end retention members being configured to operate between open and closed arrangements, where in the closed arrangement the joint sides of the first and second tread end retention members are in a generally abutting arrangement to form a die about the apertures for use in forming a joint between opposing terminal tread ends retained within the retention members, the die extending approximately about the perimeter of each aperture and being formed by opposing perimeter surfaces of closely arranged and oppositely aligned apertures of the first and second tread end retention members, where in the open arrangement the die is in a separated, open arrangement, where the die comprises a first surface at least partially forming a perimeter about the first tread end retention member aperture and a second surface at least partially forming a perimeter about the second tread end retention member aperture, where the perimeter surface for at least one of the first and second tread end retention members forms the terminal surface of a ridge, the ridge extending outwardly from the joint side of the body in the lengthwise direction of the corresponding tread end retention member and being arranged between the aperture and a recess arranged along the joint side of the body for receiving excess tread joining material;
arranging an elastomeric joining material of a desired thickness between the terminal ends of each first and second tread end; and,
forming a joint between the tread ends by directing the terminal ends towards each other and into forceful engagement with the elastomeric joining material to form a joint between the tread portions, whereby the first and second tread end retention members form a die about a perimeter of the joint in the closed arrangement of the first and second tread end retention members, an inner profile of the die substantially matching the outer profile of each terminal tread end.

10. The method of claim 9, where the joint side forms a terminal end of the body.

11. The method of claim 9, where one or more guide pins are arranged along the joint side of the first and second tread end retention members and one or more corresponding holes are arranged along the other of the first and second tread end retention members, whereby each of the one or more holes is arranged to receive one of the one or more guide pins when the first and second tread end retention members are in the closed arrangement.

12. The method of claim 9, where in the step of forming a joint the first surface at least substantially closes upon the opposing second surface.

13. The method of claim 12, where in the step of forming a joint the first surface engages the second surface to form a discontinuity between the joint and the excess portion of joint material discharged from the joint.

14. The method of claim 9, where in the step of forming a joint the die generally separates the excess portion of the elastomeric joining material from the joint.

15. The method of claim 14, where in the step of forming a joint the die directs an excess portion of the elastomeric joining material outwardly from the joint to provide a thin extension of joining material having a thickness equal to or less than 0.05 mm.

16. The method of claim 15, where in the step of forming a joint the die further directs the excess portion of elastomeric joining material into a recess of the die to form a collected portion of joining material beyond the thin extension, the collected portion having a width greater than a width of the thin extension of joining material.

17. The method of claim 9, where the profile of each terminal tread end generally matches the other.

18. The method of claim 9 further comprising the step of:
forming a desired terminal end of at least one of the tread portions.

19. The method of claim 18, wherein in the step of forming the terminal ends comprises cutting the tread ends by performing a water jet cutting operation.

20. The method of claim 9 further comprising the step of:
at least partially curing the elastomeric joining material within the joint.

* * * * *